G. GRAHAM.
BALL CHECK VALVE.
APPLICATION FILED AUG. 23, 1915.
1,158,483.
Patented Nov. 2, 1915.
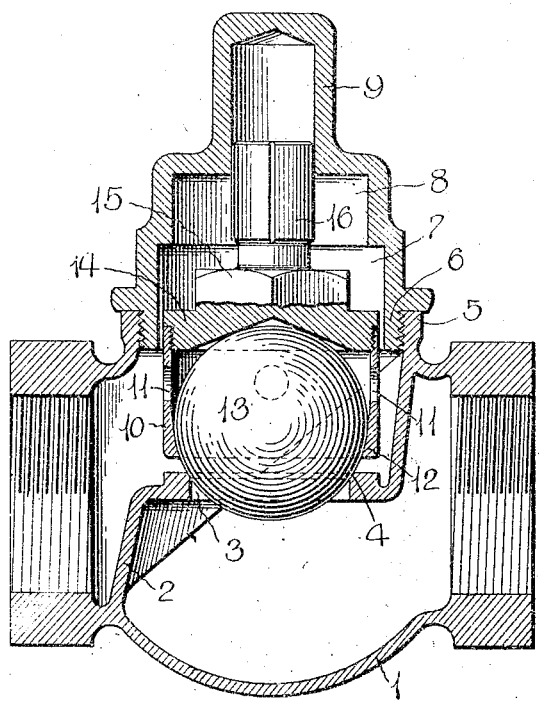
Witnesses
Chas. W. Stauffiger
Anna M Dorr
Inventor
George Graham,
By
Attorney

UNITED STATES PATENT OFFICE.

GEORGE GRAHAM, OF DETROIT, MICHIGAN.

BALL CHECK-VALVE.

1,158,483.  Specification of Letters Patent.  Patented Nov. 2, 1915.

Application filed August 23, 1915. Serial No. 46,854.

*To all whom it may concern:*

Be it known that I, GEORGE GRAHAM, a citizen of the United States of America, residing at Detroit, in the county of Wayne and State of Michigan, have invented certain new and useful Improvements in Ball Check-Valves, of which the following is a specification, reference being had therein to the accompanying drawings.

This invention relates to ball check valves.

The objects of my invention are, first, to provide a self contained ball check valve of simple construction that is sensitive to pressure fluctuations at the ends of the valve; second, to furnish ball check valves with a novel cage free to rise and fall and guided relative to a seat by a detachable bonnet; third, to provide a self adjusting ball check valve that at all times insures a non-leakable connection when the valve is closed, and fourth, to provide a check valve consisting of comparatively few parts that are inexpensive to manufacture, durable, easy to assemble and highly efficient for the purposes for which they are intended.

The above and other objects are attained by a mechanical construction that will be hereinafter specifically described and then claimed, and reference will now be had to the drawing, wherein there is illustrated a longitudinal sectional view of a self contained ball check valve in accordance with this invention.

The valve comprises a conventional body 1 having a dividing partition 2 provided with an opening 3 establishing communication between the ends of the body. The material bordering upon the opening 3 provides a valve seat 4 and in the same axis as the opening 3 is a connection 5 for a stepped bonnet 6, which is screwed or otherwise mounted in the connection 5. The bonnet 6 has clearance recesses or compartments 7 and 8 and a tubular guide 9, all of which are concentric of the bonnet.

Detachably mounted in the bonnet 6 and free to rise and fall therein is a cage, comprising an annular wall or shell 10 provided with radially disposed openings 11. The lower end of the shell 10 has the edges thereof reamed, upset, inbent or otherwise shaped, as at 12 to support a valvular member 13 in the form of a spherical body or ball. The valvular member 13 is free to revolve within the shell 10 and protrudes from the shell to engage the seat 4 and positively close the opening 3 of the partition 2.

The upper end of the shell 10 is interiorly screwthreaded to receive a cap 14, which has a nut 15 and a post 16. The post 16 is slidably mounted in the tubular guide 9 of the bonnet and the recesses or compartments 7 and 8 of the bonnet provide clearance for the cap 14 and the nut 15 respectively. The bottom side of the cap 14 has a conical recess 17 into which the valvular member 13 extends. The cap 14 limits the upward movement of the valvular member 13 within the cage, but permits said valvular member to freely revolve, whereby said member will present a fresh seating surface to the seat 4, thereby avoiding wear at any particular point upon the valvular member.

It is through the medium of the detachable cap 14 that the valvular member 13 is placed in the cage, and with the openings 11 above the point of contact between the cage and the member 13, fluid can readily enter said opening to seat the valvular member 13 when there is a back pressure of fluid or a reduction in the pressure.

I attach considerable importance to the simplicity of construction, particularly the few parts composing the valve, as easy access is had to each and every part, and in the manufacture of the valve the parts can be expeditiously assembled.

One embodiment of my invention has been illustrated but it is to be understood that the structural elements are susceptible to modifications without departing from the scope of the appended claim.

What I claim is:—

In a self contained ball check valve, the combination with a valve body having a dividing partition providing an opening and a seat, of a bonnet detachably connected to said valve body and providing clearance recesses and a tubular guide in the vertical axis of the opening of said dividing partitions, a cage free to rise and fall in said bonnet, and comprising an annular shell having the lower end thereof reamed, a valvular member supported in said shell by the reamed end thereof, and adapted to engage the seat of said dividing partition, said shell having openings therein above the point of contact between said shell and said valvular member, a cap detachably mounted in the upper end of said shell and limiting the upward movement of said valvular member in said shell, a nut forming part of the top of said cap, and a post carried by said nut and extending into the tubular guide of said bonnet.

In testimony whereof I affix my signature in presence of two witnesses.

GEORGE GRAHAM.

Witnesses:
 LEWIS E. FLANDERS,
 ANNA M. DORR.